(12) United States Patent
Schwarzkopf

(10) Patent No.: US 9,602,029 B2
(45) Date of Patent: Mar. 21, 2017

(54) METHOD FOR OPERATING AND APPARATUS FOR ACTIVATING A ROTATING, BRUSHLESS ELECTRICAL MACHINE

(71) Applicant: Brose Fahrzeugteile GmbH & Co. KG, Wuerzburg, Wuerzburg (DE)

(72) Inventor: Johannes Schwarzkopf, Marktheidenfeld (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 79 days.

(21) Appl. No.: 14/605,515

(22) Filed: Jan. 26, 2015

(65) Prior Publication Data

US 2015/0214869 A1 Jul. 30, 2015

(30) Foreign Application Priority Data

Jan. 24, 2014 (DE) ........................ 10 2014 000 945

(51) Int. Cl.
| | | |
|---|---|---|
| *G05B 11/28* | (2006.01) | |
| *H02P 6/00* | (2016.01) | |
| *H02P 27/08* | (2006.01) | |
| *H02M 7/5395* | (2006.01) | |
| *H02M 1/00* | (2006.01) | |

(52) U.S. Cl.
CPC .......... *H02P 6/002* (2013.01); *H02M 7/5395* (2013.01); *H02P 6/28* (2016.02); *H02P 27/085* (2013.01); *H02M 2001/0054* (2013.01); *Y02B 70/1491* (2013.01)

(58) Field of Classification Search
USPC ..... 318/599, 400.14, 400.2; 363/21.1, 21.18, 363/26, 41
See application file for complete search history.

(56) References Cited

U.S. PATENT DOCUMENTS

| | | | |
|---|---|---|---|
| 2004/0080293 A1* | 4/2004 | Kurosawa ............... | H02P 6/182 318/400.11 |
| 2005/0174076 A1* | 8/2005 | Katanaya .......... | H02M 7/53873 318/400.28 |
| 2009/0230907 A1 | 9/2009 | Scharzkopf | |

(Continued)

FOREIGN PATENT DOCUMENTS

WO WO 2008/006745 A2 1/2008

*Primary Examiner* — Jorge L Carrasquillo
(74) *Attorney, Agent, or Firm* — Muncy, Geissler, Olds & Lowe, P.C.

(57) ABSTRACT

A method for operating a brushless, rotating electrical machine, including at least three phase windings, each of which has a first phase winding terminal and a second phase winding terminal. The phase windings are connected to each other, in particular the particular second phase winding terminals are connected to a shared star point, and phase-width-modulated voltage signals being applied separately to each individual phase winding, and at least one selected phase winding being at least temporarily connected to a constant electrical potential. To minimize switching operations and to reduce the alternating current component of the current source, the pulses of the pulse-width-modulated signals applied to the remaining phase windings are at least temporarily phase-shifted with respect to each other during the period in which the selected phase winding is connected to a constant electrical potential.

7 Claims, 7 Drawing Sheets

(56) References Cited

U.S. PATENT DOCUMENTS

| | | | |
|---|---|---|---|
| 2012/0074888 A1* | 3/2012 | Maekawa | H02P 6/18 318/400.36 |
| 2012/0075900 A1* | 3/2012 | Nakagawa | H02M 7/53875 363/132 |
| 2013/0033911 A1* | 2/2013 | Mizukoshi | H02M 7/53873 363/131 |
| 2013/0039100 A1* | 2/2013 | Kazama | H03K 17/164 363/41 |
| 2013/0271047 A1* | 10/2013 | Imamura | B62D 5/046 318/400.2 |
| 2014/0077733 A1* | 3/2014 | Kashima | H02P 27/00 318/400.2 |
| 2014/0077738 A1* | 3/2014 | Iwaji | H02P 27/08 318/400.36 |
| 2014/0226381 A1* | 8/2014 | Sasaki | H02M 7/5387 363/97 |

* cited by examiner

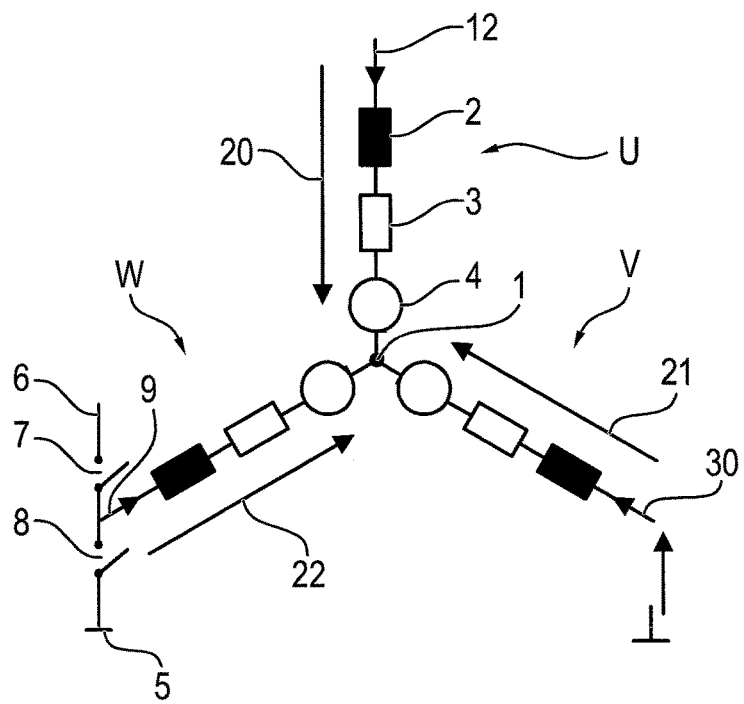
FIG. 1
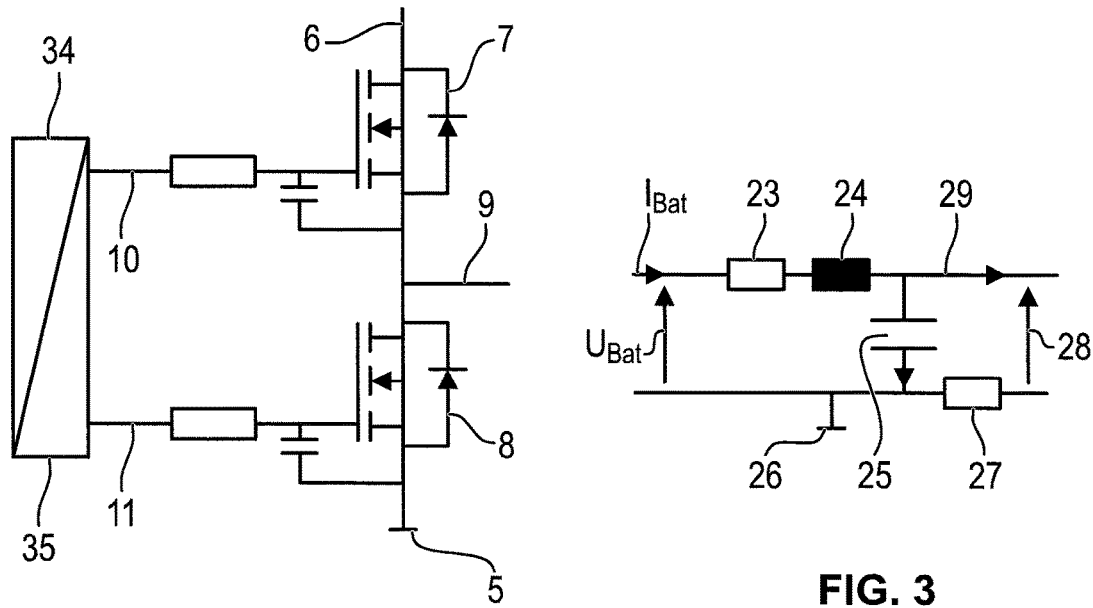
FIG. 2
FIG. 3

METHOD FOR OPERATING AND APPARATUS FOR ACTIVATING A ROTATING, BRUSHLESS ELECTRICAL MACHINE

This nonprovisional application claims priority to German Patent Application No. 10 2014 000 945.9, which was filed in Germany on Jan. 24, 2014, and which is herein incorporated by reference.

BACKGROUND OF THE INVENTION

Field of the Invention

The present invention relates to rotating electrical machines and to brushless machines which include at least three phase windings which are connected to each other.

Description of the Background Art

To avoid the known disadvantages of rotating electrical machines having mechanical commutator devices in the form of brushes, for example the formation of brush arcing and the problems of wear on the mechanical commutator device with corresponding losses of useful power, so-called brushless electrical machines were developed using the capabilities of power electronics, whose susceptibility to faults is much lower and whose wear is essentially determined by bearing wear and is thus very low.

In a brushless electric drive of this type, the rotor usually has permanent magnets, which move within a rotating magnetic field of the stator that is provided with phase windings. The windings of the stator are activated with the aid of power semiconductor switches, in particular with the aid of power transistors, in particular MOSFETs. The different phase windings of the stator are activated cyclically, a pulse-width modulation normally being used for activating the individual phase windings for the purpose of applying a precisely and quickly controllable current thereto.

A rotating electrical machine comprising multiple phase windings is known from WO2008/006745, which corresponds to US 20090230907, in which the activation is carried out by alternately supplying different voltage potentials to the phase winding terminals, a terminal potential being maintained constantly in time intervals at one of the phase windings. The electrical potentials at the remaining phase winding terminals may be dynamically controlled in such a way that corresponding current characteristics are generated therein. The supply of voltage potentials and the application of current to the remaining phase windings are sensibly carried out with the aid of pulse-width-modulated signals, which are switched back and forth between a lower voltage level and an upper voltage level at high frequency, the current intensity generated in a phase winding being determined, for example, by the pulse duty factor of the assigned pulse-width-modulated signal. Since the phase windings are coupled with each other, for example in a star or delta circuit, and the current intensities generated essentially depend on the voltage differences between the voltages supplied to the first phase winding terminals, a first phase winding terminal of a selected phase winding may be connected to a fixed potential, for example, to ground potential or to the higher voltage potential of a DC link, and the differential voltages between all phase winding terminals may be predetermined by suitably calculating and generating the voltages at the terminals of the remaining phase windings. As a result, the supply voltage which is applied to the first, selected phase winding does not have to be switched back and forth between the different levels, so that the switching losses generated by the switching operations may be eliminated with regard to this phase. Overall, the switching losses of the machine are thus reduced. As a result of the reduction in switching frequency, an improvement of the electromagnetic compatibility (EMC) is also achieved.

A method is known from US 20040080293 A1, in which a selected phase winding is temporarily connected to a constant electrical potential, while pulse-width-modulated signals are applied to the remaining phase windings, and the pulses thereof are phase-shifted with respect to each other.

SUMMARY OF THE INVENTION

It is therefore an object of the present invention to provide is to further reduce switching losses and also to optimize the load on the current and/or voltage source.

In the method according to an embodiment of the invention, a selected phase winding can also be temporarily connected to a constant electrical potential, while pulse-width-modulated signals are applied to the remaining phase windings. To preferably minimize switching losses overall and also to minimize alternating voltage components in the current source supplying the phase windings, it is furthermore provided that the pulses of the pulse-width-modulated signals applied to the remaining phase windings are at least temporarily phase-shifted with respect to each other as a function of the current directions in these remaining phase windings during the period in which the selected phase winding is connected to a constant electrical potential.

Due to an at least temporary phase shift of the individual voltage pulses of the phase windings which are not connected to a fixed electrical potential—the so-called remaining phase windings—the current and voltage demand of the individual phase windings to be acted upon is equalized over time at the common current/voltage source. Within the scope of the pulsing of the pulse-width modulation, an equally oriented current should not be applied simultaneously to two phase windings. The voltage source is, in principle, protected thereby. By setting the first phase winding to a fixed voltage level, the number of switching operations is reduced overall, since voltage pulses are to be supplied only to a number of phase windings that is reduced by one.

An advantageous method of the invention provides that the pulse-width-modulated voltage signals applied to the remaining phase windings can be continuously phase-shifted with respect to each other during the period in which the selected phase winding is connected to a constant electrical potential.

In this embodiment of the invention, the maximum load of the current/voltage source is reduced at least during the periods in which the currents in the remaining phase windings have the same direction, due to the phase shift of the pulsing of the pulse-width-modulated voltage signals, and the current load thereof becomes relative, so that the alternating current component also decreases. The current intensity measurement is also made easier in the stated periods in which the current directions in the remaining phase windings coincide, due to the reduced variability of the current intensity in the current/voltage source, since longer measuring periods are available therefor within the duty cycle.

Another method of the invention provides that the pulse-width-modulated voltage signals applied to the remaining phase windings can be temporarily phase-shifted with respect to each other and temporarily not phase-shifted with respect to each other during the period in which the selected phase winding is connected to a constant electrical potential.

This variant of the invention allows the voltage signals of the remaining phase windings to be shifted with respect to each other only when the corresponding currents have the same direction. In periods in which the currents flowing through the remaining phase windings have opposite directions, it may be advantageous to not permit a phase shift between the voltage pulses, since in this case the current intensities to be supplied are to be subtracted from each other, and both the current load on the voltage source and its alternative current component may thus be able to be kept low.

The current direction is therefore measured in the individual phase windings to which pulse-width-modulated signals are applied. It is decided whether or not a phase shift between the voltage signals is generated as a function of the current intensities and current directions.

The current direction may be understood to be the orientation of the current with regard to a reference point, for example in the event of a star circuit of the electrical machine. Partial currents directed to the star point thus have the same direction, while currents flowing away from the star point are oriented opposite these flowing currents. In a delta circuit, for example, current flowing in the clockwise direction may be construed as having the same direction and same orientation, while current flowing in the counterclockwise direction are opposite the currents flowing in the clockwise direction.

The invention may also be advantageously embodied by the fact that the pulse-width-modulated voltage signals applied to the remaining phase windings are phase-shifted with respect to each other during the periods in which the currents flowing through the remaining phase windings have coinciding current directions with regard to an electrical connecting point, at which at least two of the remaining phase windings are connected to each other, in particular with regard to the star point in a star circuit.

In this variant of the invention, the current intensity and direction in the remaining phase windings are continuously measured, and it is decided continuously or periodically as a function thereof whether or not the voltage signals applied to the remaining phase windings are phase-shifted with respect to each other.

It may also be advantageously provided that the pulse-width-modulated voltage signals applied to the remaining phase windings are phase-shifted with respect to each other only during the periods in which the currents flowing through the remaining phase windings have the same current directions with regard to the connecting point of at least two phase windings, in particular with regard to the star point in a star circuit.

In this case, the load of the voltage source, with a relatively low alternating voltage, is minimized in the periods in which the current directions in the remaining phase windings are the same, and at least the current load of the voltage source is optimized in the phases in which the current intensities in the remaining phase windings are different.

It may also be advantageously provided that the phase shifts between the pulse-width-modulated voltage signals applied to the remaining phase windings are between 150° and 210°, in particular 180°.

Another embodiment of the invention provides that the current intensity at a shared current source feeding the phase windings, in particular a DC link, and the instantaneous values of the current intensities in the remaining phase windings and, in particular, in the selected phase winding, are determined from one or multiple measurements.

Since the pulse-width-modulated signals applied to the remaining phase windings are activated and deactivated at different times within the pulsing of the pulse-width modulation, due to the variable power demand in the individual phase windings, i.e., they have different pulse duty factors, the current load flowing through an individual phase winding being acted upon may be measured during a period of the pulse-width modulation at a first point in time, and the sum of the supplied currents may be measured at a second point in time if two phase windings are acted upon at the same time. The individual current intensities in the phase windings as well as the directions of the currents may be determined from these two measured values, taking into account the inductances, the induced voltages and the disturbances. The measurement is, in principle, simplified in a phase shift of the pulse-width-modulated signals of the supplied phase windings, since the phases of constant current intensity (in which no PWM signals are activated or deactivated) are longer in this case.

Another embodiment of the invention provides that the instantaneous values of the current intensities flowing through the remaining phase windings and, in particular, also through the selected phase winding, are estimated, in particular on the basis of the phase voltages.

If the measurement may not be carried out in the manner described above for situation-specific reasons, the current intensities may be estimated on the basis of the voltage supplied to the phase windings. Depending on the available resources, inductances, induced voltages and loads of the electrical machine may also be taken into account.

The invention also relates to a brushless, rotating electrical machine including at least three phase windings, each of which has a first and a second phase winding terminal, the phase windings being connected to each other—in particular connected to the second phase winding terminals having a shared star point—and to an apparatus for the purpose of activation, pulse-width-modulated voltage signals being separately applied to each of the individual phase windings. A first switching device at least temporarily connects a first phase winding to a constant electrical potential of a voltage source, in particular a DC link. A device is used to ascertain current intensities in the remaining phase windings. As a function of the current directions in the remaining phase windings, a second switching device is configured to activate and deactivate a phase shift of the pulses in these phase windings.

The apparatus permits the activation of an electrical machine with the aid of pulse-width-modulated signals according to the method described above, the phase winding having the greatest current intensity being ascertained first according to one specific embodiment, and this phase being usually fixedly connected to either a high or a low potential of the pulse-width-modulated voltage characteristic at least for a period of time. The high voltage potential or the low voltage potential is selected depending on which of the aforementioned potentials at which an application of voltage pulses to the selected phase is avoidable, and the necessary currents may be generated in this phase preferably largely due to the corresponding combination of the voltages in the remaining phase windings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematic representation of the phase windings of a three-phase electrical machine having a star circuit;

FIG. 2 shows a bridge circuit for activating one phase winding of an electric motor;

FIG. 3 shows an equivalent diagram for a voltage supply of a phase;

DETAILED DESCRIPTION

Figure 4:
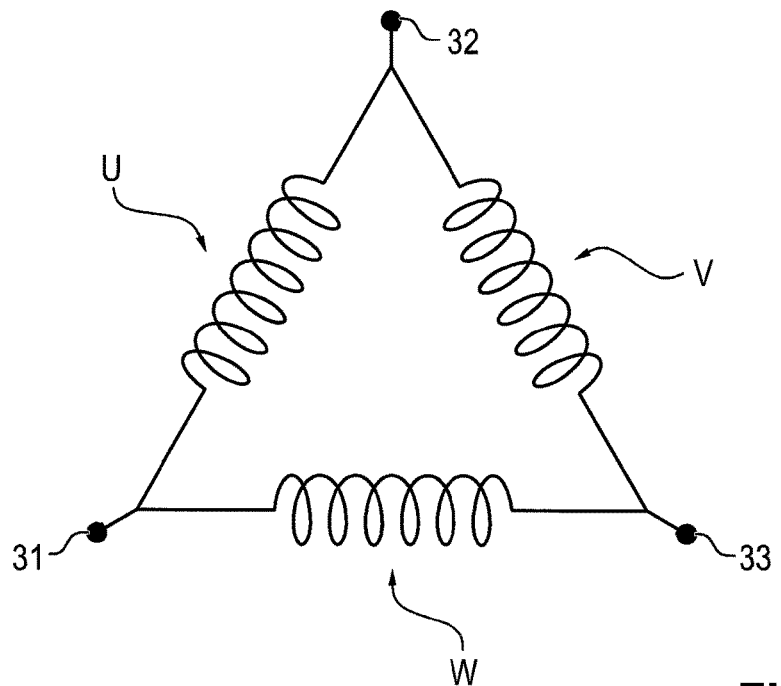
FIG. 4 shows a schematic representation of an electrical machine having a delta circuit of three phase windings.

FIG. 1 shows a schematic representation of a star circuit of three phase windings U, V, W, star point 1 forming the connection of phase windings U, V, W, at which their second phase winding terminals are connected to each other. The individual phase windings are shown in the form of an equivalent diagram, each including an inductor 2 and an ohmic resistor 3 as well as a voltage drop, which is generated—represented on the basis of circuit 4—with the aid of a voltage (EMK, EMF) induced on the basis of the motion. The voltage dropping over each phase winding U, V, W is represented by arrows 20, 21 or 22 and, in each case, occurs as the sum of the voltage drops over the inductor and the ohmic resistor as well as the induced voltage.

The activation of a brushless electric drive of this type, which is operated in a star circuit, may take place with the aid of a so-called B6 circuit, for example, a typical semiconductor bridge circuit, in which either a higher direct voltage level or a lower direct voltage level, in particular ground potential, may be supplied to each phase winding, pulsed at a high frequency. An electric drive of this type is thus controllable with respect to rotational speed, power and direction of rotation.

An arrangement of two switches for phase W is illustrated schematically by way of example in FIG. 1, the ground potential terminal being designated by reference numeral 5 and a higher direct voltage potential being designated by reference numeral 6. First terminal 9 of phase winding W may be connected to either the higher direct voltage potential or to ground potential via switches 7, 8. If switch 7 is closed and switch 8 is opened, terminal 9 is connected to the higher voltage potential. If switch 7 is opened and switch 8 is closed, first terminal 9 of phase winding W is connected to ground potential. Each of first phase winding terminals 9, 12, 30 is connected to a switch arrangement of this type. Depending on the switch position of individual switches 7, 8, two different voltage levels may thus be applied to each phase winding U, V, W.

FIG. 2 shows a detailed representation of a possible structure of a circuit comprising a constellation of two semiconductor switches 7, 8, similar to the designations in FIG. 1, via which two different voltage potentials may be connected to a phase winding U, V, W in a targeted manner. The first phase winding terminal has the reference numeral 9. A low voltage level, for example the ground potential, is designated by ground potential terminal 5, while the higher direct voltage potential is present at terminal 6. Switches 7, 8 are implemented as MOSFETs, each of which is capable of through-switching or blocking, and which may be activated with regard to their switching state by a control voltage. In FIG. 2, the control voltage inputs are designated by reference numerals 10 and 11, respectively. By correspondingly activating control voltage inputs 10, 11, either a direct voltage potential of a higher voltage level or of a lower voltage level or ground potential may be supplied to a phase winding U, V, W of a circuit, for example a star circuit of an electric drive.

Control voltage inputs 10, 11 are activated by a first switching device 34 and by a second switching device 35, first switching device 34 defining the beginning and the end of the voltage pulse or the pulse duration or the pulse duty factor, while second switching device 35 is able to switch as needed between a phase shift of zero and a defined phase shift of 180 degrees, for example.

FIG. 3 shows an equivalent diagram of a voltage source, which is able to supply, for example, the higher voltage level at terminal 6 in FIG. 2 to ground potential. Reference numeral 23 designates the internal resistance of the voltage source, reference numeral 24 designates the self-inductance, reference numeral 25 designates the capacitance, reference numeral 26 designates the ground potential terminal, reference numeral 27 designates a shunt (measuring resistor) at which the useful voltage drops, reference numeral 28 designates the supplied useful voltage and reference numeral 29 designates the supplied current. The current and voltage (on the left side of the circuit) are supplied, for example, by a battery or by a DC link of a power converter.

An activating circuit for a star circuit according to FIG. 1 usually has semiconductor bridges for each phase winding, as illustrated, for example, in FIG. 2.

This applies similarly to a delta circuit illustrated schematically in FIG. 4, which may also be used as a typical circuit of an electric drive, including correspondingly different drive characteristics than a star circuit in the known manner. The above description in connection with FIG. 1 applies to phases U, V, W. With regard to hardware, the activating circuit may also be implemented similarly to a star circuit, whereby regulating mechanisms of the activating circuit may be different.

The method according to the invention may also be used in a delta circuit—as illustrated in FIG. 4—in that two of three phase windings U, V, W are dynamically activated via phase winding terminals 31, 32, 33, while a single selected phase winding terminal 31, 32, 22 is set to a fixed voltage level.

Figure 5:
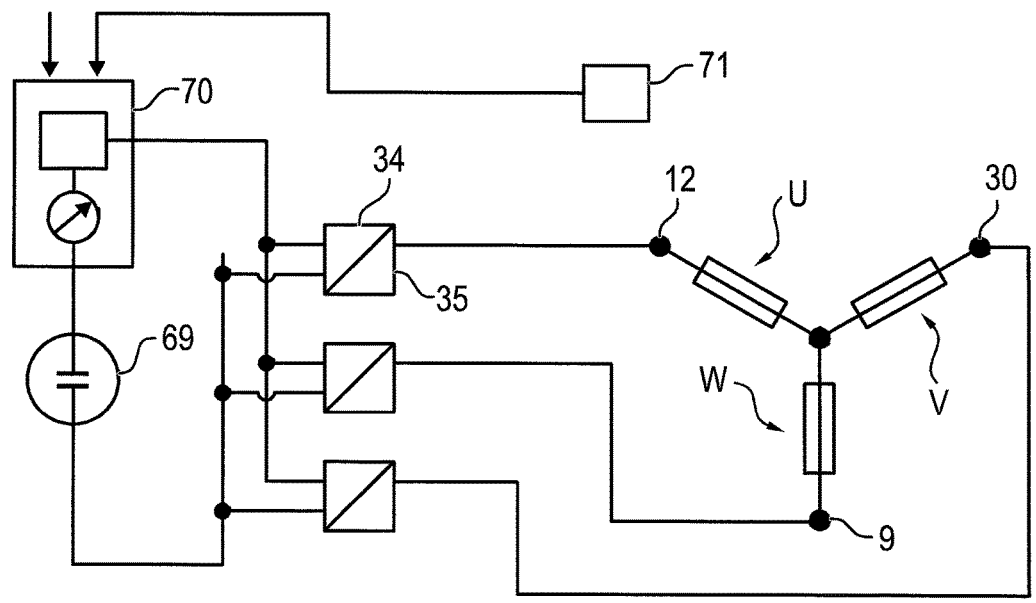
FIG. 5 shows a schematic representation of an apparatus for activating an electrical machine, based on the example of a machine having a star circuit.

FIG. 5 shows an activating circuit, in which a voltage/current source 69 supplies a direct current to two terminals in the form of a DC link. First and second switching devices 34, 35 are connected directly to one terminal of the voltage/current source and are connected to a second terminal via a device 70, in which the current intensity of the current/voltage source is measured at different points in time, and instantaneous current intensities in the phase windings are determined therefrom. In addition, setpoint values for operating the electrical machine and, in particular, also measured values of a position sensor 71 of the electrical machine, are supplied to the device. The pulse-width modulation signals and the optionally fixed voltage values may be generated for individual phase winding terminals 9, 12, 30 in three individual apparatuses, each of which includes a first and a second switching device 34, 35. However, a central apparatus having a first and a second switching device may also be provided for the coordinated activation of the three phase windings.

Specifically, the signal characteristic of the individual phase winding terminals is illustrated and explained on the basis of FIGS. 6 through 10 described below, as well as how the voltage signals at the individual phase windings may be advantageously controlled or regulated and the consequences that result therefrom with regard to the currents in the phase windings and the supply current of the external current/voltage source.

The diagrams each include four horizontal sections situated above one another. In each case, the time is plotted horizontally, on the X axis, a total of three periods of the pulse-width modulation being represented in each case (for example, one period may be approximately 20 microseconds). Within one switching period, the voltage at each phase winding terminal is switched on and off again a single time, usually with the aid of a semiconductor switching element, i.e., typically with the aid of a MOSFET, a thyristor or an IGBT. Each of these switching operations naturally causes switching losses and EMC disturbances (EMC=electromagnetic compatibility). The pulse duty factors of the individual phases, i.e., the time component of the period over which the voltage is to be activated at the particular phase terminal, is determined on the basis of measurements of the actual current intensity in the individual phase windings. The instantaneous load, the actual rotational speed and the setpoint rotational speed, among other things, are to be taken into account in an electric motor.

Figure 6:
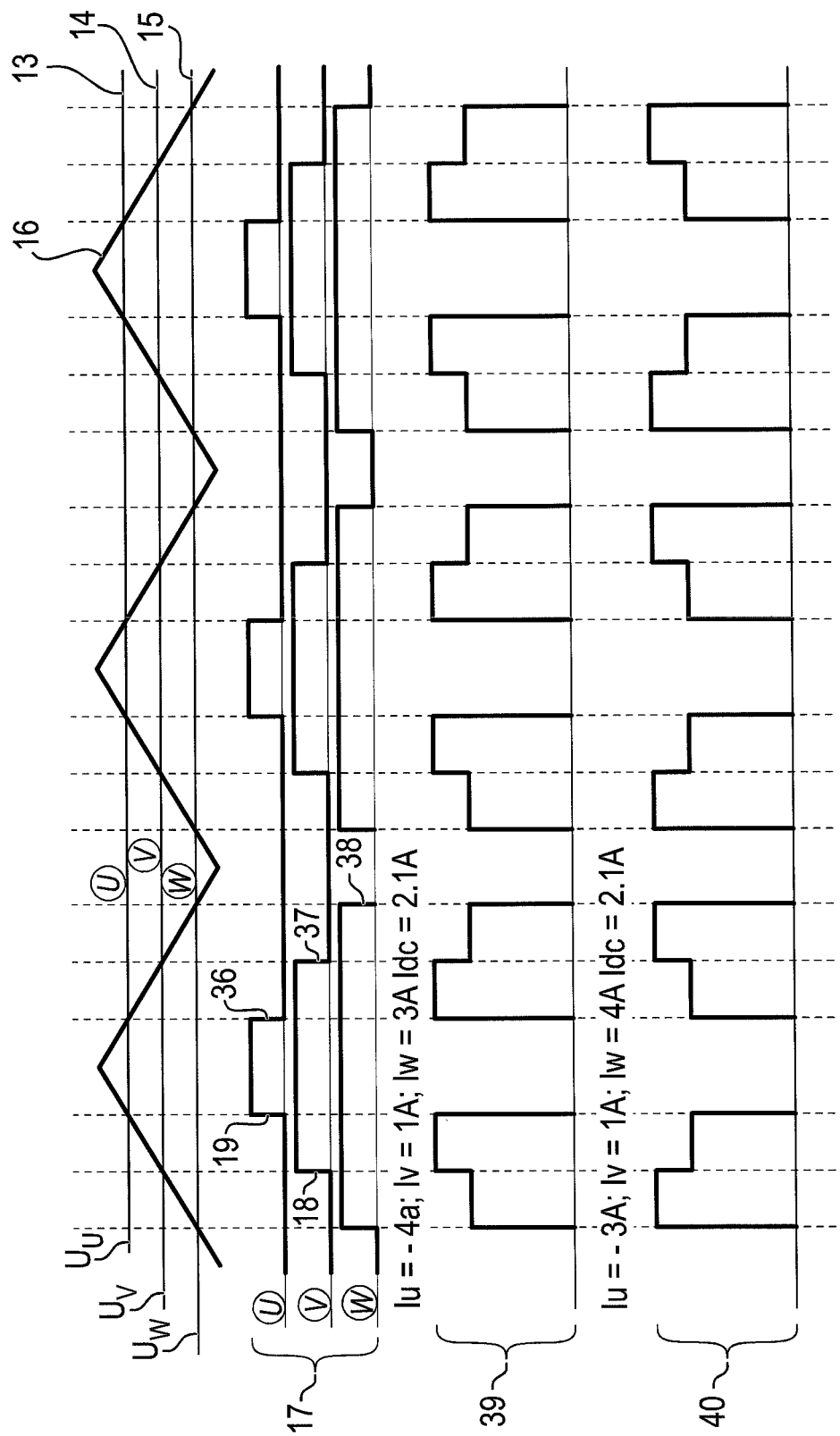
FIG. 6 shows a first diagram of the pulse-width-modulated signals of three phases, which are pulsed at the same frequency and phase-synchronously with respect to each other.

A customary activating method is illustrated in the diagram in FIG. 6, in which the first phase winding terminals of all three phase windings of an electric motor are each activated with the aid of a pulse-width-modulated signal. The instantaneous setpoint voltages of the three phases are indicated in the figure by an instantaneous value as horizontal lines 13 (voltage setpoint value $U_U$), 14 (voltage setpoint value $U_V$) and 15 (voltage setpoint value $U_W$). It is required that the setpoint voltage values vary over time as a function of the rotational speed of the motor after one sine function. As a result, the three plotted lines 13, 14, 15 move up and down periodically in the perpendicular direction, i.e., in the direction of the X axis.

Sawtooth-shaped line 16 represents a periodically linearly rising and falling counter content of a counter implemented in a microcontroller. The intersection points between the fixed thresholds of the individual phases for a determined point in time, represented by horizontal lines 13, 14, 15 with sawtooth-shaped line 16, represent the activation and deactivation points in time for the voltage pulses applied to the individual phases. If a voltage threshold is therefore particularly high, the corresponding horizontal line will be situated at a low point, so that the sampling time of the voltage pulse and the pulse duty factor of the pulse-width-modulated signal are great, and a voltage is applied to the corresponding phase winding for a relatively long time (compared to the remaining phase windings).

In the second horizontal section of the diagram in FIG. 6, viewed from above, which is designated by reference numeral 17, the voltage characteristic at the first terminals of the particular phase windings is illustrated in a time-resolved manner. As a result therein, a voltage is first applied to phase winding W as the time progresses, a voltage signal is then applied to phase winding V at point in time 18, and a voltage signal is subsequently applied to phase winding U at point in time 19. The corresponding voltage signals of phase windings U, V, W are consecutively deactivated again at points in time 36, 37, 38. Afterwards, this voltage characteristic is repeated periodically for the three phases.

In third section 39 of the diagram in FIG. 6, the resulting current in the shared voltage source, for example in the DC link, is shown over its time progression in the situation in which the absolute current value in phase winding U is four amperes (4 A), the absolute current value in phase winding V is one ampere (1 A) and the absolute current value in phase winding W is three amperes (3 A), whereby, with regard to the directions from and to the star point (calculated to be either positive in the direction of the star point and negative away from the star point or vice versa), the current direction is the same in phase windings V and W, while the current direction in phase U is opposite the first two current directions.

Only one current flowing through phase winding W at a level of 3 A initially occurs in the DC link during the first switching period prior to point in time 18, to which an additional current of 1 A flowing through phase winding V is added, starting at point in time 18. At point in time 19, the current flowing through phase winding U is additionally added by setting a corresponding voltage potential at the phase winding to "high," the current direction of the current flowing through phase winding U being opposite and of the same level as the other two currents, so that the total current in the DC ink is equal to 0 during the period between point in time 19 and point in time 36.

After point in time 36, the current flowing through phase winding U is deactivated again, so that a total current at the level of 4 A flowing in sum through phase windings V and W remains and is further reduced by 1 A at point in time 37, whereupon only the current at the level of 3 A flowing through phase winding W remains at point in time 38.

Overall, a large number of switching operations occurs per period of the pulse-width-modulated signals, and a large alternating current component results in the DC-link capacitor, due to the greatly varying current intensities in the DC link.

In fourth section 40 of the diagram in FIG. 6, the situation is illustrated in which the current directions in phase windings V and W are opposed to each other, and the current direction in phase U has the same direction as the one in phase V. Once again, a large number of switching operations results, including a similarly large alternating current component.

Figure 7:
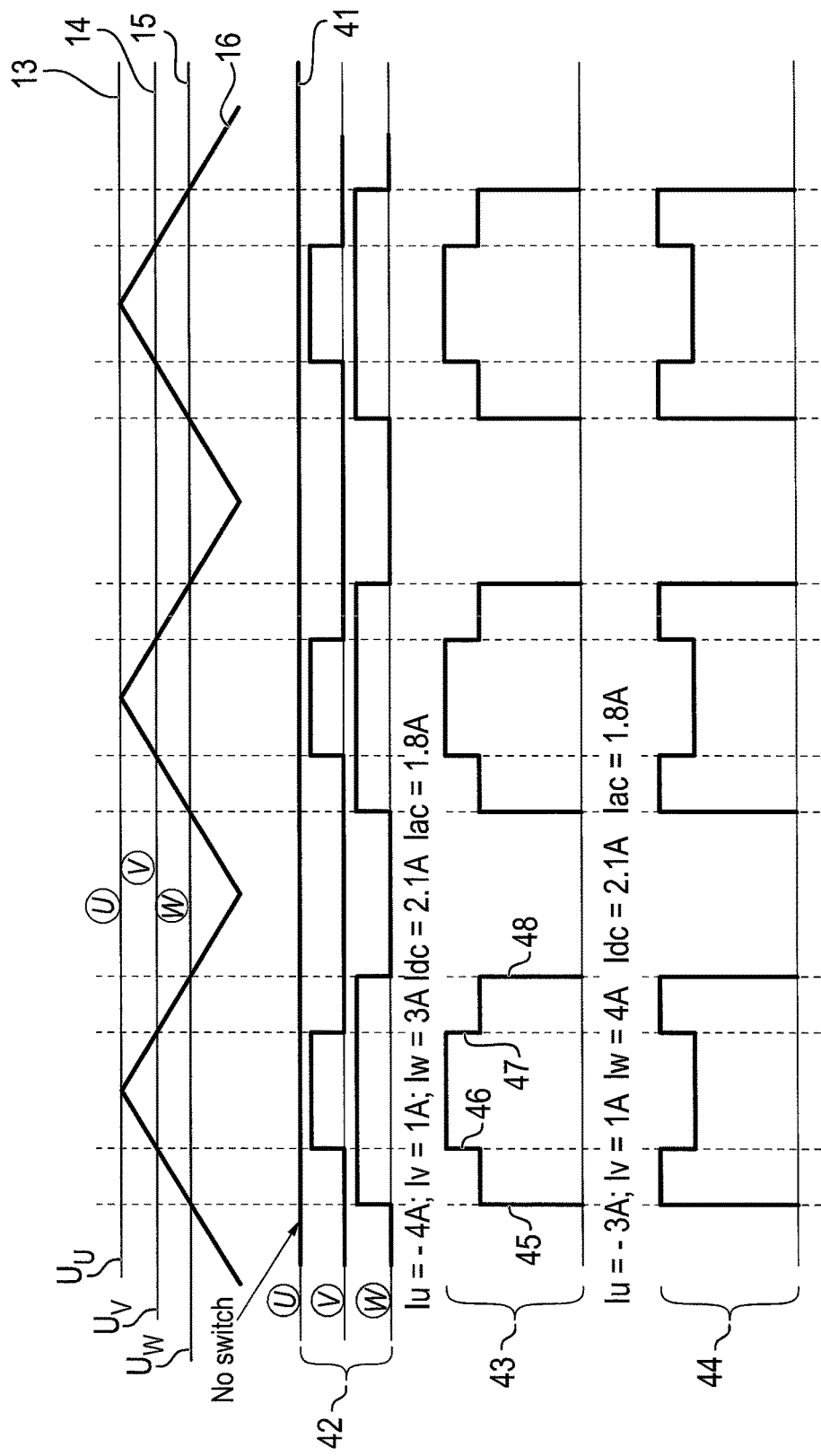
FIG. 7 shows a second diagram of the pulse-width-modulated signals of three phases, phase winding U being set to constant potential.

An activation method according to the cited prior art (WO 2008/006754 A2) is illustrated in FIG. 7, in which one phase winding, namely the phase winding of phase U, is continuously connected to the upper level of the voltage of the DC link. This is represented by the corresponding placement of horizontal line 13 at the upper peak of sawtooth curve 16 in the uppermost section of the diagram in FIG. 7. Consequently, a constant characteristic of the voltage at phase U, represented by horizontal line 41, occurs in second section 42 from above in the diagram in FIG. 7. Voltage pulses are applied only to remaining phases V and W by the activating circuit, it being possible to set the currents to be adjusted and flowing through individual phase windings U, V with the aid of the differential voltages. Depending on the regulating task, at least one phase may be ascertained in each case, which may be set to a constant voltage level, either to the upper voltage level of the DC link of the voltage source or to the lower level of this voltage, it being possible to supply the necessary differential voltages for generating the target currents by correspondingly selecting the voltage level supplied to the remaining phase windings.

Accordingly, the voltage characteristic at phase windings V and W is illustrated in second section 42 of the diagram in FIG. 7. The current characteristic in the DC link is illustrated in third section 43 of the diagram in FIG. 7, provided that the current intensities in phase windings V and W to which the signals are applied, have the same direction of these currents 1 A and 3 A. A current rise to 3 A first occurs at point in time 45 by switching the corresponding semiconductor bridge and applying a current to phase winding W. An increase to a total of 4 A occurs at point in time 36, a decrease to 3A occurs at point in time 47 and a total current of zero (0 A) occurs at point in time 48 by switching off the voltage signal at phase winding W. A relatively large number of switching operations having significant, abrupt changes in current intensity still occurs overall.

In the variant illustrated in fourth section 44 of the diagram, the currents in phases V and W are oriented in opposite directions. A current of 4 A first occurs at point in time 45, which is reduced to 3 A at point in time 46, is increased back to 4 A at point in time 47 and drops to 0 ampere at point in time 38.

Due to this variant, fewer switching operations occur overall than when activating all phase windings individually, along with longer time periods over which a total current in the voltage source is constant, so that the current measurement is also easier. The number of switching operations, however, is not reduced to the desirable extent overall, and the alternating current component which must be supplied by the current source, and thus the DC-link capacitor, is unfavorably large. A more than desirable load is thus placed on the DC-link capacitor.

Figure 8:
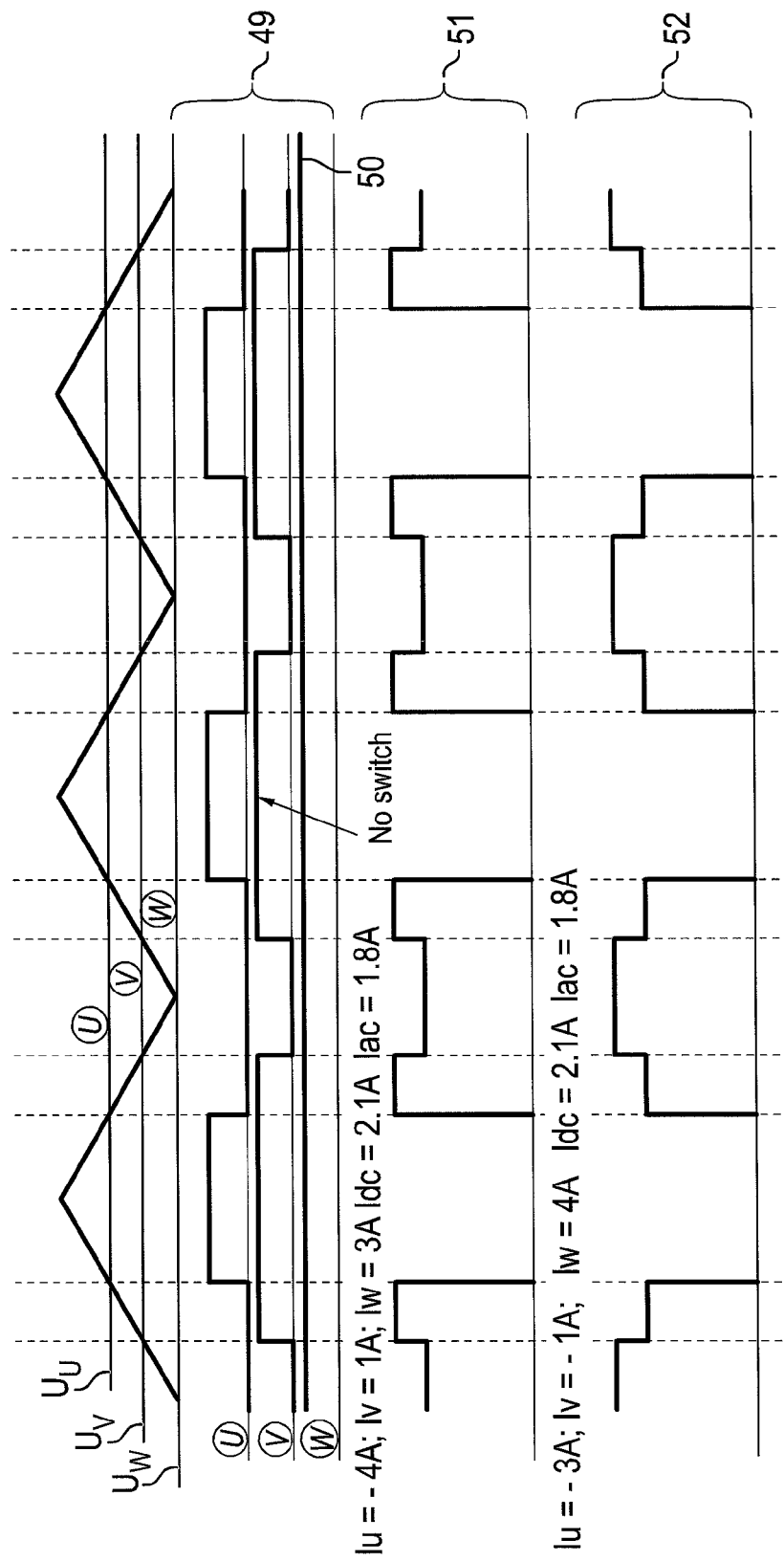
FIG. 8 shows a third diagram of the pulse-width-modulated signals of three phases, phase winding W being set to constant high potential, while in-phase signals are applied to phase windings U and V.

Like in FIG. 7, a scenario is illustrated in FIG. 8, in which one of the phase windings is connected to a constant potential, in this case the first phase winding terminal of phase winding W. This is apparent from second section 49 of the diagram in FIG. 8, in which horizontal line 50 represents the voltage characteristic at the terminal of phase winding W. Pulse-width-modulated signals are supplied at remaining phase windings U, V, third section 51 of the diagram in FIG. 8 illustrating the situation that the currents in phase windings U and V have different current directions with regard to the directions from and to the star point, while the currents in the aforementioned phase windings have the same direction according to the situation shown in fourth section 53.

As in the cases shown in the diagram in FIG. 7, a reduction in the number of switching operations likewise occurs, whereby the alternating current component in the current source, i.e., in particular a capacitor of the DC link, is undesirably large.

Figure 9:
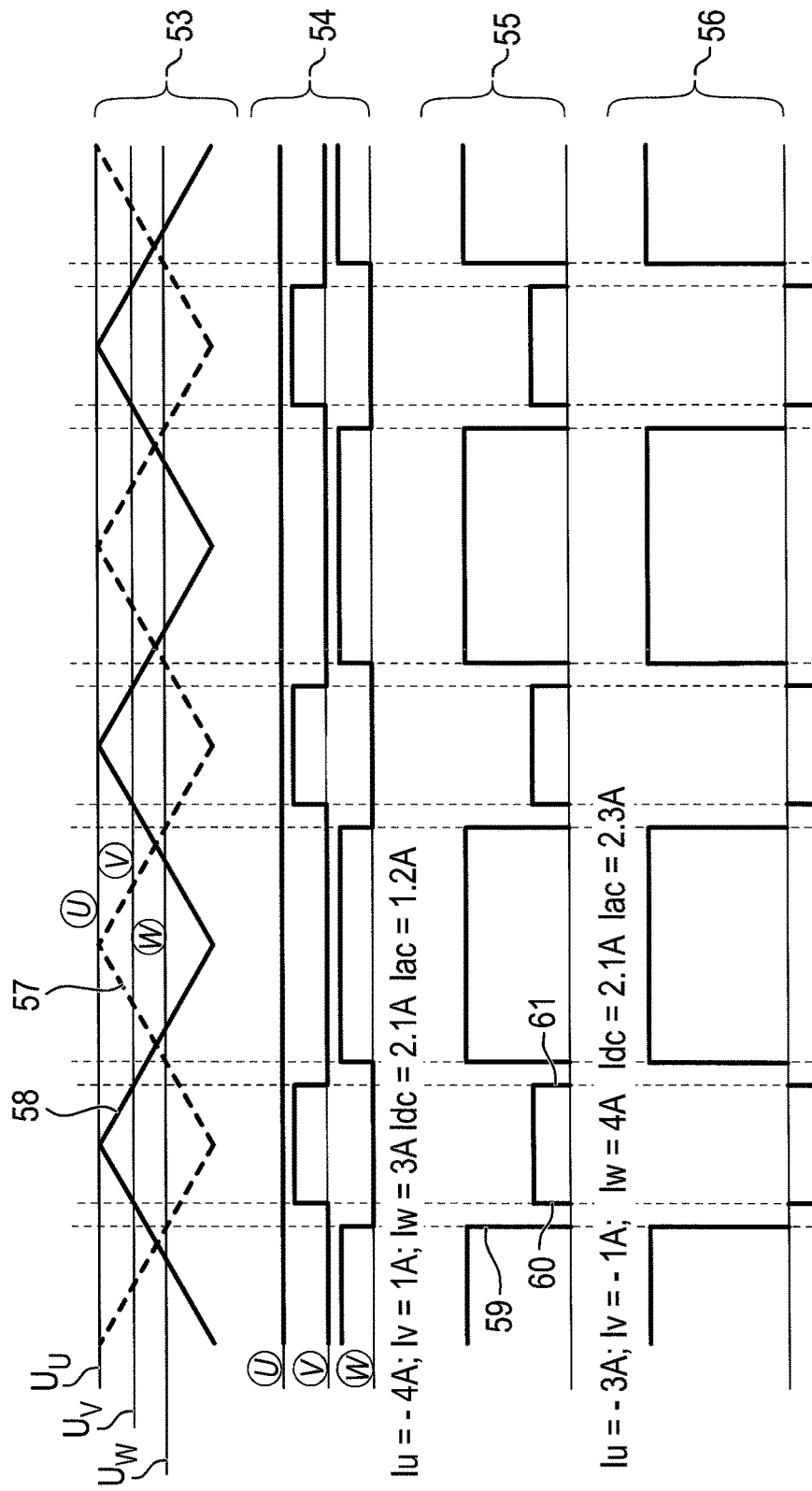
FIG. 9 shows a fourth diagram of the pulse-width-modulated signals of three phases, phase winding U being set to constant high potential, while signals which are phase-shifted with respect to each other are applied to phase windings V and W.
Figure 10:
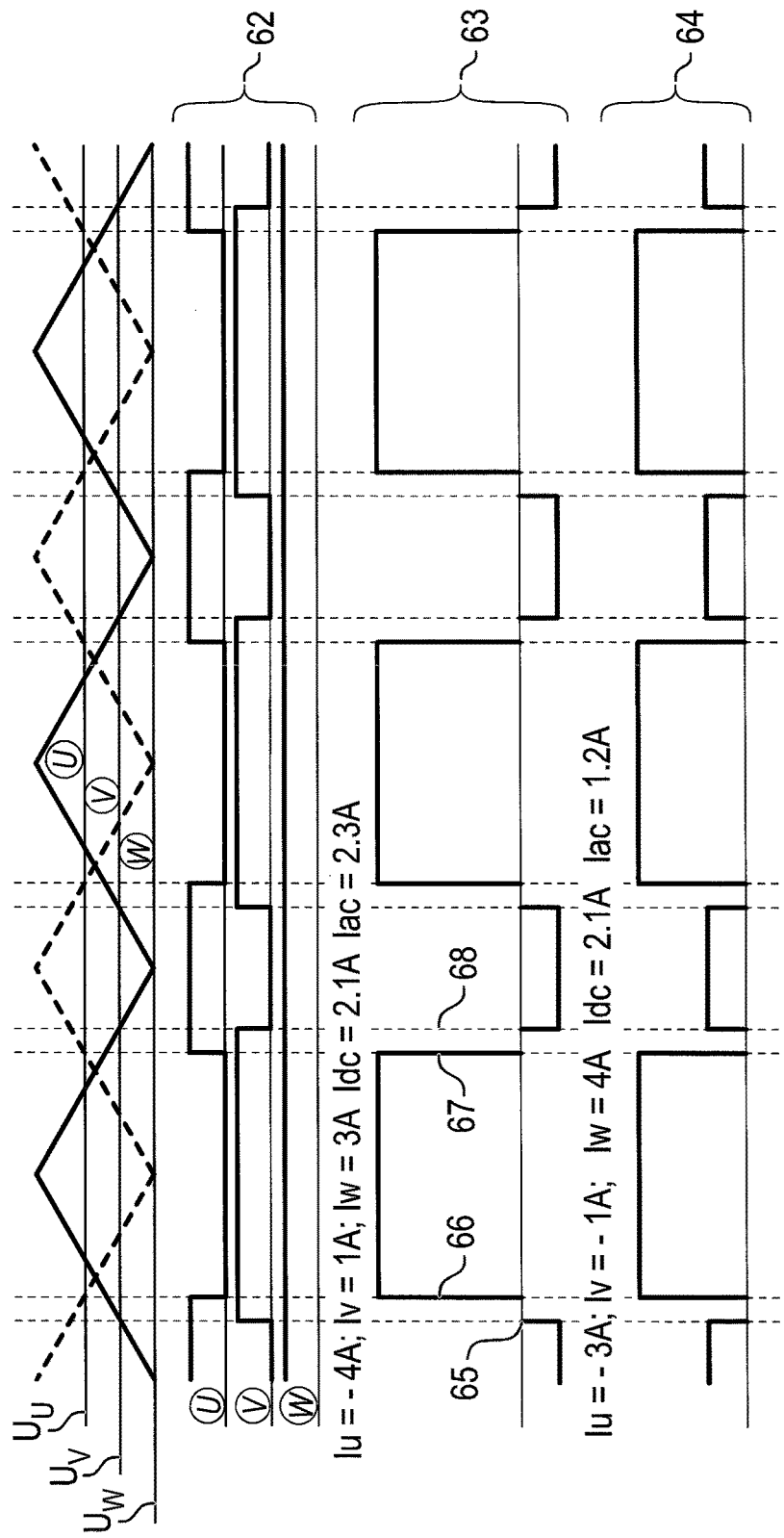
FIG. 10 shows a fifth diagram of the pulse-width-modulated signals of three phases, phase winding W being set to constant high potential, while signals which are phase-shifted with respect to each other are applied to phase windings U and V.

FIGS. 9 and 10 illustrate variants of the invention, which make it possible to reduce the number of switching operations as well as the alternating current component in the DC link and also to cause more time to be available for the particular current measurements to be carried out multiple times within one pulse period of the pulse-width-modulated signal than in the cases illustrated above.

For this purpose, FIG. 9 shows a diagram, whose first section 53 shows that selected phase winding U is at a constant, low voltage level, while pulse-width-modulated voltage pulses are applied to remaining phase windings V, W. Second section 54 of the diagram in FIG. 9 shows that the periodic voltage signal, which is present at phase winding W, is phase-shifted by 180° with respect to the voltage signal at phase V. The voltage pulses which are supplied to phase winding W are oriented to dashed sawtooth-shaped line 57 in first section 53 of the diagram, while the voltage pulses supplied to phase V are oriented to solid sawtooth-shaped line 58 of first section 53, which is phase-shifted with respect to line 57 by 180° degrees.

Third section 55 of the diagram in FIG. 9 shows the situation in which the current directions in phases V and W coincide. The current intensity in phase V is 1 A, and the current intensity in phase W is 3 A. The current intensity in phase winding U is
−4 A, and the direction of the current in this phase is opposite the current directions in phases V and W. In third section 55, it is apparent that currents for phases U and W of the DC link must be supplied by the current source during the time segment up to point in time 59, while the currents for phases U and V must be supplied from point in time 60 to point in time 61. Due to the phase shift between the voltage pulses for phase windings V and W, the abrupt changes in current in the DC link or the abrupt changes in the current loads for the capacitor in the DC link must be reduced.

In fourth section 56 of the diagram in FIG. 9, it is apparent that a phase shift of this type between the pulses applied to phase windings V and W leads to another and less desirable effect in the event that the current directions in these phase windings are different with regard to the star point. In the current characteristic in the link, which undergoes greater abrupt changes between points in time 59, 60 and after point in time 61, this is apparent by the fact that the current intensity in phase V is associated with a current direction which is opposite the current direction in phase W.

As a result, if the alternating current component in the current source of the activating device is to be minimized, a phase shift between the pulse-width-modulated signals of the two phases to which signals are applied is sensible only if the current directions thereof coincide with regard to the star point. This is the case when the selected phase, which is connected to a fixed potential, preferably has a reliably and, if possible, greater current intensity over a predicable period of time, in terms of the absolute value, than any of the other two phase windings. In the activating circuit of an electrical machine, this characteristic may be determined from the load state and the control variables, which depend, among other things, on the setpoint rotational speed and the actual rotational speed as well as the inductances and induced voltages. Corresponding instantaneous current intensities may be ascertained with the aid of multiple measurements in the DC link, it being known that only the current flowing through one of the phases is measured at a first point in time, while the summation current flowing through multiple phase windings is measured at a second point in time.

If the instantaneous current intensities are not reliably ascertainable with the aid of measurements, they may be estimated on the basis of the supplied terminal voltages or calculated by way of estimation.

According to the diagram in FIG. 10 (see second section 62 therein), the first phase terminal of selected phase W is set to the upper potential level of the DC link, while pulse-width-modulated voltage pulses are applied to remaining phase windings U, V, which are phase-shifted with respect to each other by 180°. In third section 63 of the diagram, it is apparent that, while the number of switching operations is reduced at a current intensity of 3 A in phase W, a current intensity 1 A in phase V and a current intensity of −4 A in phase U, i.e., even with different current directions in the phases to which the pulses are applied, and also the periods in which a constant current intensity exists in the DC link are favorably long, so that the measurement of the current intensity is made easier, on the other hand, however, the changes in the total current intensity in the DC link are unfavorably great, the current intensity is −1 A up to point in time 65 as the sum of the current of phases U and W, zero amperes between points in time 65 and 66 and 4 A between point in time 66 and point in time 67 as the sum of the currents in phases V and W, whereupon it drops back to 0 amperes at point in time 67 and to −1 A at point in time 68. In this constellation, the alternating current component under the load of the DC link is unfavorably high, so that a phase shift between the pulses applied to phases U and V is better suppressed in this situation.

Fourth section 64 of the same diagram shows the situation in the event that the current in phase W is 4 A, while the currents in remaining phases U, V are −3 A and −1 A and correspondingly also have the same current direction. Consequently, not only negative currents and sign changes of the current are avoided, but the absolute current fluctuations are also much smaller than in the variant illustrated in third section 63. In this case, which is illustrated in section 64, a phase shift between remaining phases U, V is thus very sensible and protects the capacitor in the DC link. The number of switching operations is minimized, and relatively long periods without changes in current intensity are available in the current/voltage source, in which the total current intensity may be measured.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a brushless, rotating electrical machine, which includes at least three phase windings, each of which includes at least one first phase winding terminal and one second phase winding terminal, the phase windings being connected to each other, the method comprising:
applying pulse-width-modulated voltage signals separately to each of the individual phase windings; and
connecting at least one selected phase winding, at least temporarily, to a constant electrical potential,
wherein the pulses of the pulse-width-modulated signals applied to the remaining phase windings are at least temporarily phase-shifted with respect to each other during the period in which the selected phase winding is connected to a constant electrical potential,
wherein the pulse-width-modulated voltage signals applied to the remaining phase winding are phase-shifted with respect to each other as a function of the current directions in the remaining phase windings,
wherein the pulse-width-modulated voltage signals applied to the remaining phase windings are phase-shifted with respect to each other during the periods in which the currents flowing through the remaining phase windings with regard to an electrical connecting point at which at least two of the remaining phase windings are connected to each other,
wherein the pulse-width-modulated voltage signals applied to the remaining phase windings are phase-shifted with respect to each other only during the periods in which the currents flowing through the remaining phase windings have the same current direction with regard to an electrical connecting point of at least two of the remaining phase windings, and
wherein the pulse-width-modulated voltage signals applied to the remaining phase windings are temporarily phase-shifted with respect to each other and are temporarily not phase-shifted with respect to each other during the period in which the selected phase winding is connected to a constant electrical potential.

2. The method according to claim 1, wherein the phase shifts between the pulse-width-modulated voltage signals applied to the remaining phase windings are between 150° and 210°, in particular 180°.

3. The method according to claim 1, wherein instantaneous values of the current intensities in the remaining phase windings and/or in the selected phase winding are determined from one or multiple measurements of the current intensity of a shared current source feeding the phase windings.

4. The method according to claim 1, wherein instantaneous values of the current intensities in the remaining phase windings or in the selected phase winding are estimated.

5. The method according to claim 1, wherein an absolute value of current intensity of the selected phase winding is greater than current intensities of the remaining phase windings when the selected phase winding is connected to the constant electrical potential.

6. A brushless rotating electrical machine comprising:
at least three phase windings, each of which includes at least one first phase winding terminal and one second phase winding terminal, the phase windings being connected to each other;
an activating apparatus configured to separately apply pulse-width- modulated signals to each of the individual phase windings;
a first switching device that at least temporarily connects a first, selected phase winding to a constant electrical potential of a voltage source;
a measuring device for ascertaining current intensities in the remaining phase windings; and
a second switching device that is configured to activate and deactivate a phase shift of the pulse-width-modulated signals at the remaining phase windings as a function of current directions in the remaining phase windings, such that the pulse-width-modulated voltage signals applied to the remaining phase windings are phase-shifted with respect to each other during the periods in which the currents flowing through the remaining phase windings with regard to an electrical connecting point at which at least two of the remaining phase windings are connected to each other, and such that the pulse-width-modulated voltage signals applied to the remaining phase windings are phase-shifted with respect to each other only during the periods in which currents flowing through the remaining phase windings have a same current direction with regard to an electrical connecting point of at least two of the remaining phase windings, wherein the pulse-width-modulated voltage signals applied to the remaining phase windings are temporarily phase-shifted with respect to each other and are temporarily not phase-shifted with respect to each other during the period in which the selected phase winding is connected to a constant electrical potential.

7. The brushless rotating electrical machine according to claim 6, wherein an absolute value of current intensity of the selected phase winding is greater than current intensities of the remaining phase windings when the selected phase winding is connected to the constant electrical potential.

\* \* \* \* \*